(No Model.) 4 Sheets—Sheet 1.

C. J. VAN DEPOELE.
FRICTION GEAR FOR ELECTRIC MOTORS.

No. 399,950. Patented Mar. 19, 1889.

Witnesses
H. A. Lamb
C. L. Sturtevant

Inventor,
Charles J. VanDepoele
By Frankland James
Attorney.

(No Model.) 4 Sheets—Sheet 2.

C. J. VAN DEPOELE.
FRICTION GEAR FOR ELECTRIC MOTORS.

No. 399,950. Patented Mar. 19, 1889.

Witnesses.
H. A. Lamb
C. L. Sturtevant

Inventor
Charles J. Van Depoele
By Frankland Jannus
Attorney (No Model.) 4 Sheets—Sheet 3.

C. J. VAN DEPOELE.
FRICTION GEAR FOR ELECTRIC MOTORS.

No. 399,950. Patented Mar. 19, 1889.

Witnesses,
H. A. Lamb
C. L. Sturtevant

Inventor,
Charles J. Van Depoele
By Frankland James
Attorney.

(No Model.) 4 Sheets—Sheet 4.
C. J. VAN DEPOELE.
FRICTION GEAR FOR ELECTRIC MOTORS.
No. 399,950. Patented Mar. 19, 1889.
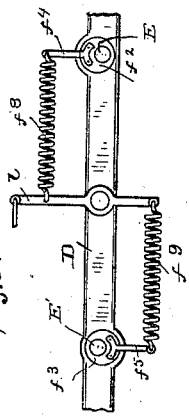
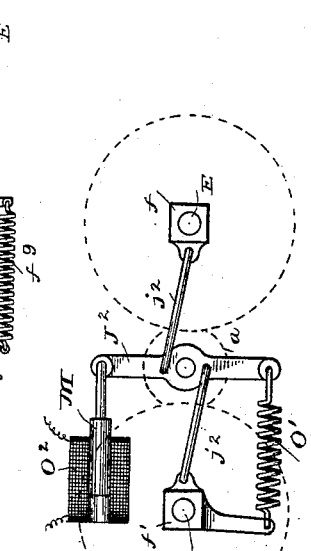
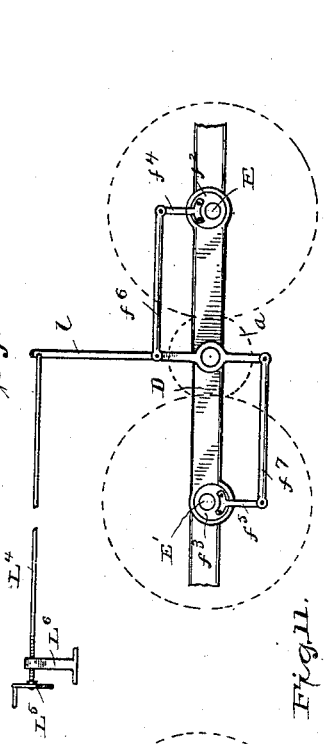
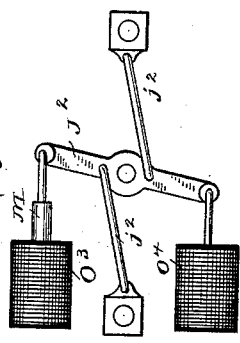
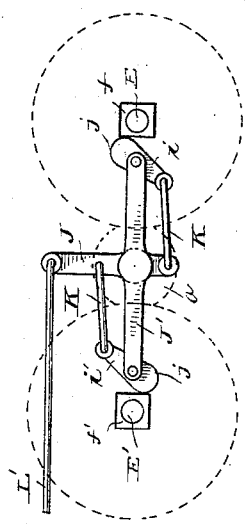
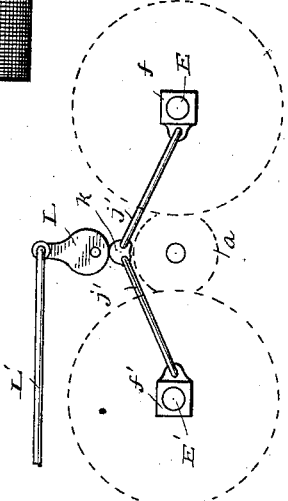
Witnesses
H. A. Lamb
C. L. Sturtevant
Inventor,
Charles J. Van Depoele
By Frankland Jannus
Attorney.

UNITED STATES PATENT OFFICE.

CHARLES J. VAN DEPOELE, OF LYNN, MASSACHUSETTS.

FRICTION-GEAR FOR ELECTRIC MOTORS.

SPECIFICATION forming part of Letters Patent No. 399,950, dated March 19, 1889.

Application filed October 31, 1888. Serial No. 289,634. (No model.)

*To all whom it may concern:*

Be it known that I, CHARLES J. VAN DEPOELE, a citizen of the United States, residing at Lynn, in the county of Essex, State of Massachusetts, have invented certain new and useful Improvements in Friction-Gears for Electric Motors, of which the following is a description.

The present invention relates to improvements in means and mechanism for applying the power developed by the rotation of the armature of an electro-dynamic motor to the propulsion of vehicles, such as railway-motors.

An important feature of the invention consists in so arranging the mechanical connections that at desired times the armature-shaft can be freed from all connection with its load by electrically or mechanically operated mechanism and be allowed to rotate freely, so that in the case of an electric railway-car, when it is desired to bring a vehicle to a stop suddenly or otherwise, according to my invention the connection between the gearing and the armature of the motor is severed and the car stopped by the application of brakes. It is well known that the rotation of a heavy armature at high speed represents a great amount of momentum, all of which has to be overcome in the stopping of a car under ordinary circumstances. If, therefore, the stoppage of the armature becomes unnecessary, the strain upon the parts, connections, and gearing and the power required to bring the vehicle to a standstill will be very much decreased.

The various details of construction and arrangement incident to the carrying out of my invention will be hereinafter described, and referred to in the appended claims.

Figure 1:
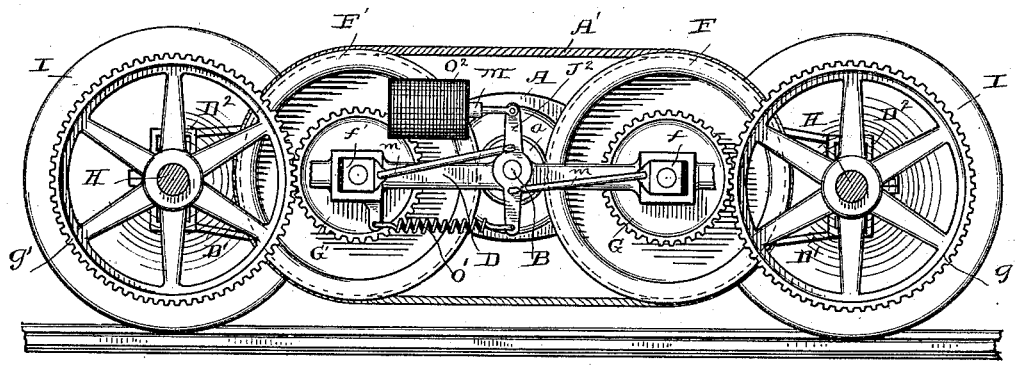
Figure 2:
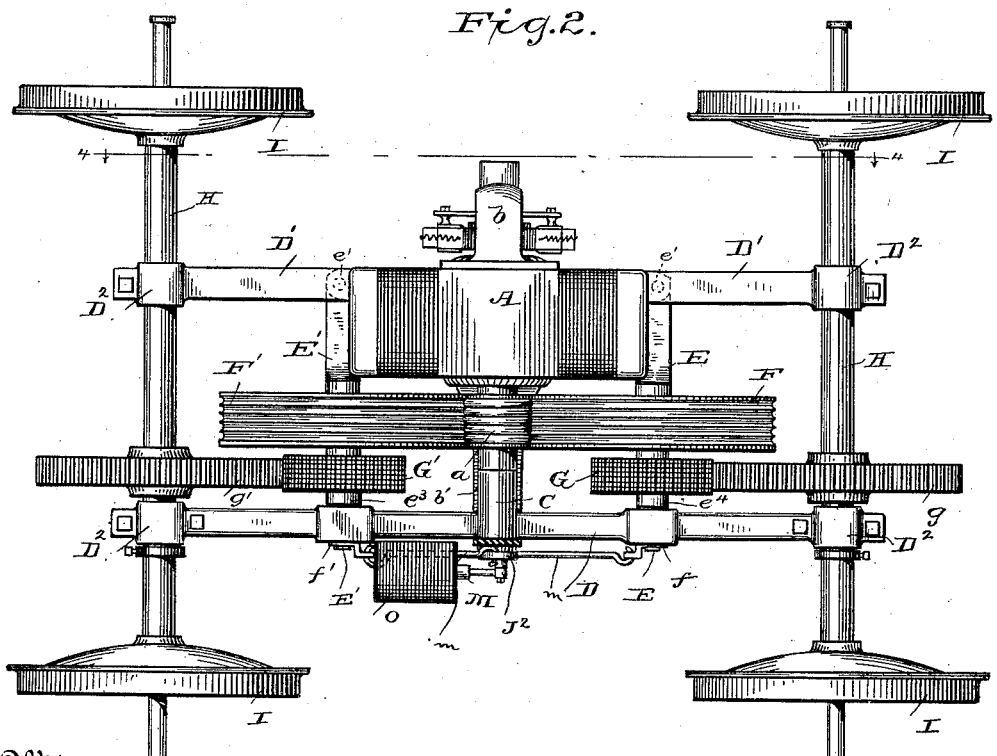
Figure 3:
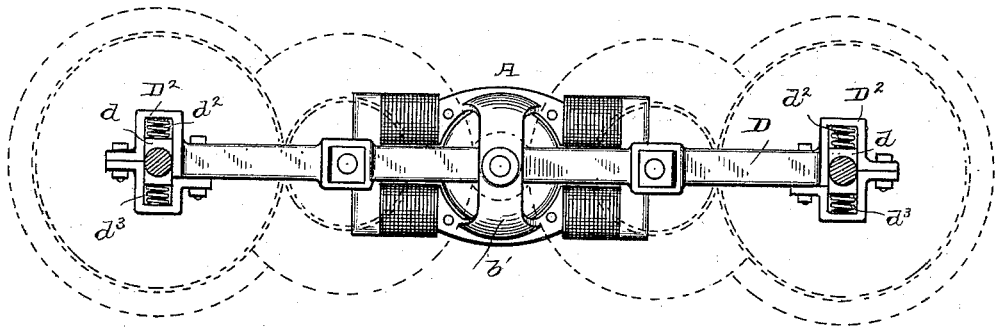
Figure 3:
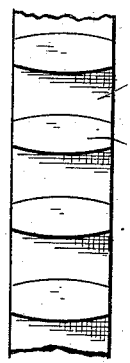
Figure 3:
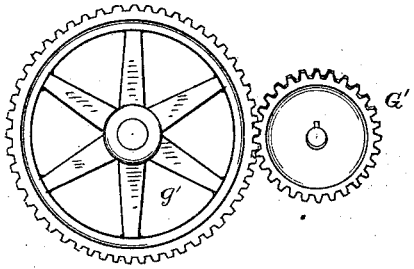
Figure 3:
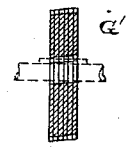
Figure 4:
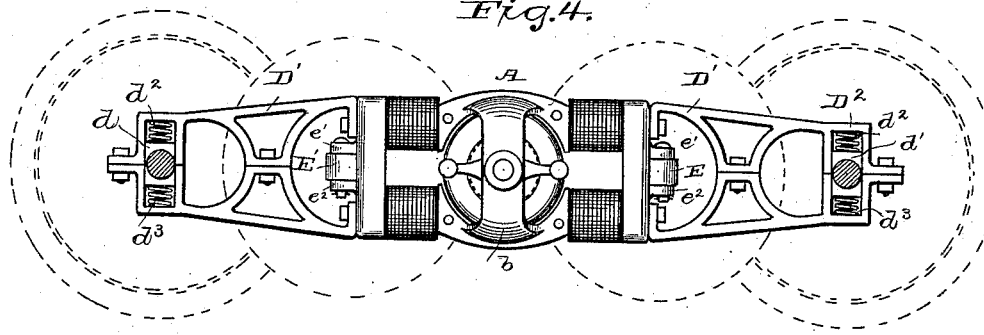
Figure 5:
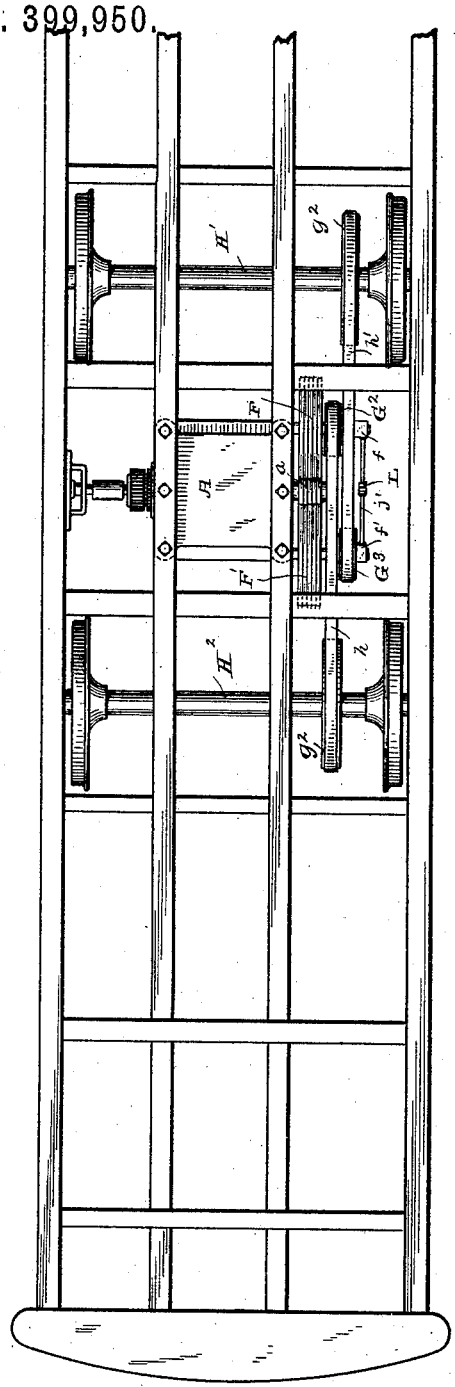
Figure 6:
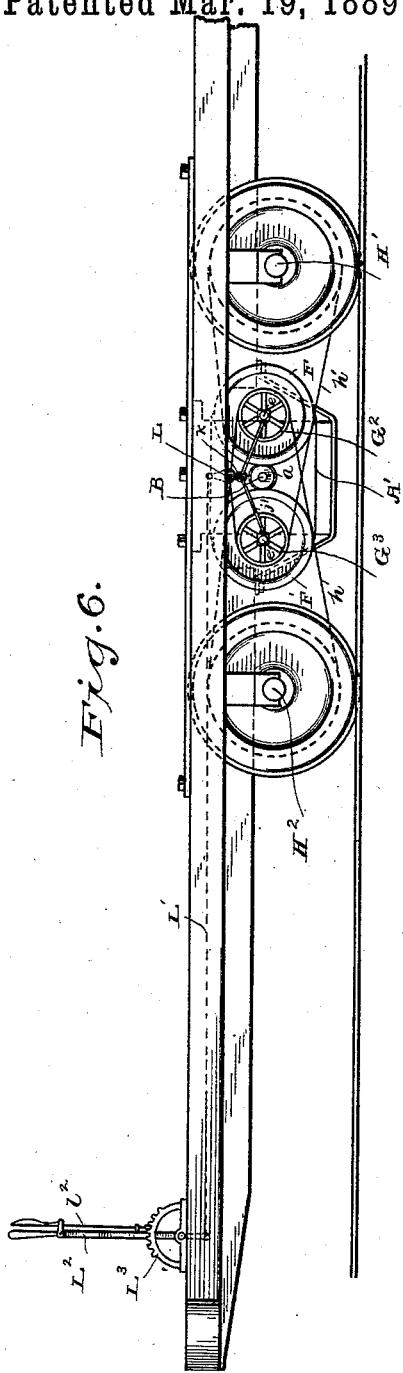

In the drawings, Figure 1 is a view in elevation showing the gearing upon an electrically-propelled street-car truck to which my invention has been applied, two of the wheels of said truck being removed. Fig. 2 is a plan view of the truck and gearing shown in Fig. 1. Fig. 3 is a side elevation of the truck shown in Fig. 2, the motor and motor-supporting frame being shown in full lines and the supporting-wheels and gearing in dotted lines. Fig. 4 is a side elevation on the line 4 4 of Fig. 2, showing in full lines the frames by which the end of the motor opposite to that shown in Fig. 3 is supported and the gearing in dotted lines. Fig. 3ª is a fragmentary detail showing a form of gear-wheel tooth. Fig. 4ª is a fragmentary detail showing one of the adjustable driving-pinions and a counter-wheel in engagement therewith. Fig. 4ᵇ is a sectional view of the pinion shown in Fig. 4ª. Fig. 5 is a plan view showing part of the frame of a car and a motor in position thereon, and embodying my invention in slightly different form. Fig. 6 is a side elevation of the construction shown in Fig. 5. Figs. 7, 8, 9, and 9ª show different mechanically-operated means for moving the friction-wheels to liberate the armature-pinion. Figs. 10 and 11 are detail views of electrically-operated mechanism for accomplishing the same purpose.

As illustrated in Figs. 1 and 2, A is a motor of any suitable or desired type, the armature-shaft B of which is provided with a friction-pinion, *a*. One end of the armature-shaft B is sustained in a bearing mounted in a yoke or support, *b*, secured to the pole-pieces of the motor or to a platform or bed-plate suitably supported beneath the vehicle. The opposite end of the said armature is mounted in a bearing, C, arranged within and sustained by a tie-beam, D, which is further supported at its central portion by a yoke, *f*, secured thereto and to the pole-pieces of the motor. The tie-beam D is made long enough to extend from one axle to the other, and is at its extremities provided with bearing-boxes *d d*, placed upon the said axles, and by which the said beam is sustained in operative position and enabled to support a portion of the weight of the motor and attached mechanism. The opposite end of the motor is sustained by a stout metallic frame or frames, which correspond to the tie-beam D. The frames D′ D′ are desirably attached to each extremity of the field-magnet poles of the motor. The frames D′ D′ may be secured by bolts to the said field-magnet extensions, and at their outer extremities are provided with bearing-boxes *d′ d′*, which, like those on the extremities of the tie-beam D, are journaled upon the axles of the truck. The extremities of the tie-beam D, as well as the outer ends of the frames D′ D′, are formed with vertical ways D² D², within which the journal-boxes $d'$ $d'$ may move vertically. The said journal-boxes are normally held in central position in the ways $D^2$ $D^2$ by supporting-springs $d^2$ $d^2$, which are placed above and below said boxes, so that the entire frame is practically spring-supported, and the motor thus mounted on a yielding support capable of absorbing the vibrations and shocks due to the motion of the vehicle. The frames $D'$ are desirably made separable, so that they can be readily placed upon and secured in position on the axles.

To each end of the motor-frame or other suitable support are attached hinge-lugs $e$ $e'$, between which are sustained by a hinge-connection the counter-shafts $E$ $E'$, upon which or within which are journaled bearing-boxes or sleeves $e^2$ $e^3$, each of which carry friction counter-wheels $F$ $F'$, arranged to engage opposite sides of the armature-pinion $a$ and driving-pinions $G$ $G'$. The outer ends of the counter-shafts $E$ $E'$ are journaled in boxes $f f'$, which are seated in openings formed in the tie-beam $D$, within which they are supported and firmly sustained. Said boxes $f f'$ are capable of some longitudinal movement within their support, so that when moved outwardly the armature-pinion $a$ will be entirely liberated and free to revolve without injuring itself or its counter-wheels. The pinions $G$ $G'$ mesh with driving-gears $g$ $g'$, secured upon the main driving-axles $H$ $H$, upon the ends of which are the carrying-wheels $I$ $I$. It will thus be understood that there is a complete chain of gearing extending in both directions from the armature-pinion to the axles $H$ $H$, and, further, that by moving the boxes $f f'$ and separating the outer extremities of the counter-shafts the armature will be entirely freed, and the axles $H$ $H$ and wheels $I$ may be stopped without any strain upon the propelling-gear, which may continue in motion ready for the next start or gradually come to rest. In passing around curves and on uneven track the respective axles by which an ordinary street-car truck is supported are caused to move independently—that is to say, one axle may be tilted with respect to the one in rear of it, and the axles consequently caused to assume a slightly criss-cross position. The necessary capacity for independent ordinary movement in the axles composing an ordinary street-car truck call for some flexibility in the gearing by which the armature-shaft is connected thereto. This may be provided for in a variety of ways. For example, the gear-wheels, as $g^3$, shown and described as extending between the counter-shafts and the carrying-axles, may be formed with teeth $g^4$, as seen in Fig. 3. This will prevent pinching and binding and place no extraordinary strain upon the connections should one wheel be tilted slightly more than its neighbor.

Another form is shown in Figs. 2 and 4ª, in which a flexible driving-pinion is provided. As indicated in Fig. 4ᵇ, this pinion is composed of a number of disks mounted upon a shaft in such manner that they are slightly loose thereon. The said disks are firmly held from rotation upon the shaft by a deeply-cut keyway; but, not being rigidly affixed thereto, they are capable of some movement among themselves, so that the pinion may assume a diagonal position with respect to the gear-wheel with which it is in mesh. Ordinarily this pinion may be formed by assembling a number of metallic disks of, say, one-half an inch thick until the desired width of face is attained, when the teeth can be cut in the usual manner, after which the connecting bolts or clamps are removed and the pinion placed loosely upon its shaft. It may, however, be advantageous in some instances to place a sheet of rubber or other elastic material between each plate of which the pinion is composed, and then secure them together by bolts passing transversely through holes of a larger diameter than said bolts, whereby a flexible and yet noiseless pinion will be produced. A great advantage of this mode of connection is that the armature may be permitted to rotate rapidly even while the car is coming to rest or at rest, thus saving the power required to overcome its momentum either in starting or stopping, and, furthermore, keeping up the counter-electro-motive force, which prevents the armature being injured by the passage of too much current therethrough at starting. The armature-pinion $a$ and the counter-wheels $F$ $F'$ are shown as being beaded friction-gears. They may be of other form, but that here shown I find extremely desirable, and a great advantage incident to friction-gearing is that it is possible therewith to gradually connect the rapidly-rotating armature with its load, and so gradually start the car without bringing too great a strain suddenly upon the armature and connections. Continuous spiral spring-belts $A'$, (omitted from Fig. 2 for clearness,) corresponding in number to the grooves in the wheels $F$ $F'$, are placed over said wheels and act to hold them normally against the pinion $a$. It is intended that these spring-belts should exert sufficient lateral pressure to maintain the necessary frictional contact between the wheels $F$ $F'$ and the pinion $a$ under ordinary circumstances. Where, however, they are not sufficient for this purpose, pressure can be exerted upon the outer extremities of the hinged counter-shafts. It will also be understood that the spring-belts could be dispensed with and the frictional contact maintained entirely by pressure exerted upon the movable outer extremities of the hinged counter-shafts.

My invention may be embodied in other forms. As seen in Figs. 5 and 6, the friction-wheels are similarly connected and the counter-shafts movably mounted. Driving-pinions $G^2$ $G^3$, corresponding to the driving-pinions $G$ $G'$, are also provided in this instance; but, as here shown, instead of meshing with other gear-wheels mounted directly upon the axles $H$ $H$ of the vehicle they are designed to receive flexible belts $h\ h'$, desirably a preferred form of link belt, although flat belts may be used, if desired. With the arrangement just described the belts $h\ h'$ are arranged crosswise of the motor, so that the greater the load upon the armature-pinion the tighter will the said belts tend to hold the gear-wheels against the gear-pinion, thus aiding the pressure of the spring-belts. The driving-pulley $G^2$ upon the axle $H^2$ is belted to the driving-pulley G on the opposite side of the armature. Similarly the driving-belt $g^3$ is belted to the driving-pulley $G^3$, also on the opposite side of the motor. The outer extremities of the counter-shafts being movably mounted, as described, it follows from this method of gearing that the strain of the belts upon the axles to be driven will react upon the driving-pulleys, and be by them communicated to the hinged counter-shafts, the sum of said power acting from opposite directions to assist the spring-belts to hold the friction-wheels against the armature-pinion, and with a pressure varying according to the load.

In Fig. 7 I have shown a simple means for separating the extremities of the counter-shafts E E'. With this end in view a rocking lever, J, is mounted concentric with the armature-shaft. A bar, J', is also supported concentrically with said shaft, and in each extremity of the bar J' is journaled a cam, $j\ j$, bearing against the inner sides of the boxes $f f'$, within which the extremities of the counter-shafts are journaled. The cams $j\ j$ are provided with lugs or arms $i$, which are connected by links K to opposite points on the lever J, so that by oscillating said lever the cams will be moved in the desired direction and caused to separate or to release the ends of the counter-shafts.

In Fig. 8 I have shown a slightly-different form of mechanism for producing a similar result. In this instance the boxes $f f'$, within which the extremities of the counter-shafts are journaled, are both connected by links $j'\ j'$ to a head or point, $k$, which is arranged to be forced downwardly to separate the boxes F F' by a cam, L.

The devices shown in Figs. 5 and 6 are operated by the longitudinal movement of a rod, L', seen in Fig. 7 as attached to the lever J and in Fig. 8 to the rocking cam L. The rod L is connected to a pivoted lever, $L^2$, desirably located on the platform within reach of the motorman, and provided with a locking-detent, $l^2$, engaging a segmental rack, $L^3$, by means of which the lever may be locked in any desired position, the action of the lever in moving the cam L or lever J being quite obvious.

In Fig. 9 is shown means for moving the extremity of the counter-shafts in either direction, so that they can be released from the pinion or held against it with great force. Upon the tie-beam D is centrally pivoted a lever, $l$. At suitable points in the tie-beam are journaled rotating boxes $F^2\ F^3$, within which the extremities of the counter-shafts E E' are eccentrically journaled. From each of the boxes $f^2\ f^3$ extend arms $f^4\ f^5$, by means whereof the said boxes may be rotated within their support and the counter-shafts moved inward or outward thereby. The arms $f^4\ f^5$ are connected to opposite parts of the lever $l$ by links $f^6\ f^7$, so that by the oscillations of said lever the boxes and counter-shafts may be moved in either direction, as desired.

The device shown in Fig. 9 is desirably operated in a somewhat different manner from that shown in Figs. 5 and 6, since it is capable of additional effects. A sliding rod, $L^4$, is pivotally attached to the lever L, by which the eccentric-bearings are manipulated, and the end of this rod is screw-threaded and mounted in a screw-threaded support, $L^6$. By means of a hand-wheel, $L^5$, or other suitable device attached to or acting upon the extremity of the said rod $L^4$ it can be caused to move longitudinally in either direction—in one direction to separate the counter-shafts E E' and free the armature-pinion $a$, and in the opposite direction to force the said counter-shafts toward each other to cause the said friction-gears on the counter-shaft to engage and press against opposite sides of the said pinion with the desired degree of force. It will be obvious that with this arrangement the spring-pulleys A', by which the said friction-wheels are otherwise held in engagement with the pinion $a$, may be dispensed with, as the adjustment of the parts by the screw-threaded rod $L^4$ will be fine enough for practical purposes. Should, however, greater resiliency be required than is found in the parts themselves, the links $f^6\ f^7$ may be replaced by strong spiral springs $f^8\ f^9$, as indicated in Fig. 9$^a$.

In Fig. 1 is shown an arrangement for actuating the counter-shafts electrically instead of manually, as just described. As shown in this figure, a lever, $J^2$, is provided, said lever being mounted concentric with the armature-shaft and provided at one extremity with retracting-spring and at the other attached to the core M of a solenoid, O. The lever $J^2$ is connected by links $m$ with the boxes $f f'$, within which the extremities of the counter-shafts are sustained. The solenoid O may be connected in a shunt-circuit spanning the motor, (not shown,) and its connections should be so arranged that when the motor is cut out current will be sent through the solenoid, causing it to draw in its core, thereby rocking the lever $J^2$ in a direction to separate the counter-shafts and liberate the armature-pinion. This will, under ordinary circumstances, release the armature at a time when no current is passing therethrough and when it is not required to perform any work, thus making the action automatic.

Instead of the arrangement just described, I may arrange a solenoid, $O^2$, with respect to the mechanical connections so that the power exerted by it will be utilized to pull the counter-shafts toward the pinion, instead of tending to push them apart, the spring O' in this case serving to separate the said countershafts when no power is being exerted by the solenoid. With this arrangement the solenoid will be included in the motor-circuit in any convenient manner, so that current will pass therethrough and its core be drawn in and act to hold the counter-shafts together whenever the motor is in operation. Whenever the motor is cut out, as previously explained, it is desirable to separate the counter-shafts and liberate the armature and pinion. With this arrangement such action will take place automatically and whenever the motor is out of circuit.

It might in some instances be desired to have both positions of the friction-gear-controlling mechanism directly within reach, and to that end I propose under some circumstances to use the arrangement shown in Fig. 11, in which is seen two solenoids, $O^3$ $O^4$, the cores of which are connected to opposite extremities of the rocking lever $J^2$, which is connected to the boxes $f f'$ of the hinged counter-shafts by links $j^2$. These two solenoids should be included in the motor-circuit and have also an independent connection with the supply-conductors, so that by means of a convenient switch they could be put in or out of circuit as desired irrespective of the movement of the motor. With this arrangement the gearing could be placed under pressure and the armature-pinion liberated whenever desired and a convenient means be thus provided for to some extent controlling the speed of the vehicle.

In addition to the different embodiments of my invention hereinbefore referred to it will be obvious that the main features thereof may be combined with other and different details to secure substantially similar results without in any way departing from the spirit of the invention.

Having described my invention, what I claim, and desire to secure by Letters Patent, is—

1. The combination, with the axles of a car and a motor for propelling the same, of a support for said motor comprising beams extending longitudinally from axle to axle, journal-bearings on said axles, and double-acting spring-connections between the journal-bearings and the ends of said tie-beams, whereby said beams form a spring-supported frame, substantially as described.

2. The combination, with two pairs of carrying-wheels, of a car, a motor for propelling the same, and a frame or support for said motor, comprising a pair of tie-beams extending between and journaled at their ends upon the said axles and carried by double-acting springs, as $d^2$ $d^3$, and arranged to sustain opposite ends of the motor and power connections.

3. The combination, with the axles of a car and a motor and connections for propelling the same, of a support for said motor, and connections comprising beams extending longitudinally between said axles, journal-bearings mounted on said axles and engaging the extremities of the motor-supporting beams, and springs connecting the ends of the beams and journal-bearings both above and below the axle, substantially as described.

4. The combination, with the axles of a car-truck and a motor for propelling the same, of a support for said motor, comprising tie-beams, as D D', extending between and springs supported above and below said axles, said tie-beams being provided with bearings for the power-connections between the motor and the axles and arranged to flexibly sustain the motor and connections.

5. The combination, with the separately-movable axles, of a car-truck and a motor and gearing extending between the armature-shaft of the motor and said axles for propelling the same, said gearing including a yielding gear-wheel arranged to accommodate any changes of position in said axles with respect to the gearing, substantially as described.

6. The combination of a truck having separately-movable axles and carrying-wheels, a motor and gearing extending between the armature-shaft of the motor and said axles for propelling the same, said gearing including a yielding gear-wheel, and a frame for supporting the motor and gearing, comprising longitudinally-extending beams attached to and uniting the parts of the gearing and separately journaled at their ends upon the axles of the truck, substantially as described.

7. The combination, with a car having carrying-wheels united by separately-movable axles, of a motor for propelling said car, and power-connections between the armature-shaft and the said axles, and a frame for supporting said motor and connections, comprising tie-beams connected with the motor and journaled at their ends upon the said axles, gear-wheels upon the axles to be driven, and a flexible gear-connection between the gear-wheel on the axles and the counter-shafts, substantially as described.

8. The combination, with the axles of a car and a motor for propelling the same, of a support for said motor, comprising beams extending longitudinally from axle to axle, said beams being formed of detachable portions, journal-bearings on said axles, and spring-connections between the journal-bearings and the ends of said supporting-beams, whereby said beams form a removable spring-supported frame, substantially as described.

9. A friction-gearing for electric motors, comprising a friction-pinion on the armature-shaft, movable counter-shafts on opposite sides of said pinion, friction gear-wheels adapted to engage the pinion, driving-pulleys also on said counter-shafts, connections between the driving-pulleys and the axle or axles to be driven, and means, substantially as described, for moving the counter-shafts to connect or disconnect the friction-gear.

10. An automatic friction-gearing for electric motors, comprising a friction-pinion on the armature-shaft, movable counter-shafts on opposite sides of said pinion, friction gear-wheels on said shafts adapted to engage opposite sides of said pinions, driving-pulleys on said counter-shafts, connections extending between said driving-pulleys and the axles to be driven, and means for holding the movable friction-wheels in engagement with the driving-pinion with a pressure proportionate to the pull of the motor upon the parts to be driven, substantially as described.

11. An automatic friction-gearing for electric motors, comprising a friction-pinion on the armature-shaft, movable counter-shafts on opposite sides of said pinion, friction gear-wheels on said shafts adapted to engage opposite sides of said pinion, driving-pulleys on said counter-shafts, connections extending between said driving-pulleys and the axles to be driven, and means for holding the movable friction-wheels in engagement with the pinion on the armature-shaft with an adjustable pressure, substantially as described.

12. An automatic friction-gearing for electric motors, comprising a friction-pinion on the armature-shaft, movable counter-shafts on each side thereof, friction-wheels on said counter-shafts adapted to engage the pinion, driving-pulleys on the counter-shafts, connections extending from said driving-pulleys to the axles to be driven, and means for moving the counter-shafts and gear-wheels into or out of engagement with the armature-pinion, substantially as described.

13. An automatic friction-gearing for electric motors, comprising a gear-pinion on the armature-shaft, movable counter-shafts on opposite sides of said pinion, gear-wheels on said counter-shafts adapted to engage with said pinion, resilient spring-belting passing around the gear-wheels and acting to press the same together against opposite sides of the pinion, means for forcibly separating said gear-wheels to free the pinion at desired times, driving-wheels upon the counter-shafts, and connections extending between the driving-wheels and the axles to be driven, substantially as described.

14. An automatic friction-gearing for electric motors, comprising a pinion on the armature-shaft, a pair of hinged counter-shafts arranged on opposite sides thereof, a tie-beam in which the outer ends of the counter-shafts are movably journaled, driving-wheels on said counter-shafts, mechanical connections between said driving-wheels and the axles to be driven, a lever mounted concentrically with the armature-shaft and mechanically connected to the movable ends of the counter-shafts, and means, substantially as described, for forcibly moving the counter-shaft and gear-wheels outwardly and away from the armature-pinion to free the same or toward and into engagement therewith to operatively connect the gearing.

15. A friction-gearing for electric motors, comprising a pinion on the armature-shaft, a pair of hinged counter-shafts arranged on opposite sides thereof, a tie-beam in which the outer ends of the counter-shafts are movably journaled, gear and driving wheels on said counter-shafts, mechanical connections between said driving-wheels and the axles to be driven, a lever mounted concentrically with the armature-shaft and mechanically connected to the movable ends of the counter-shafts, and means, substantially as described, comprising an electric motor and a retracting-spring for forcibly moving the counter-shaft and gear-wheels outwardly and away from the armature-pinion to free the same or toward and into engagement therewith to operatively connect the gearing.

16. A friction-gearing for electric motors, comprising a pinion on the armature-shaft, a pair of hinged counter-shafts arranged on opposite sides thereof, a tie-beam in which the outer ends of the counter-shafts are movably journaled, gear and driving wheels on said counter-shafts, and spring-belts upon said gear-wheels holding them against the pinion, mechanical connections between said driving-wheels and the axles to be driven, a lever mounted concentrically with the armature-shaft and mechanically connected to the movable ends of the counter-shafts, and means, substantially as described, comprising an electromotor and retracting-spring for forcibly moving the counter-shaft and gear-wheels outwardly and away from the armature-pinion to free the same or toward and into engagement therewith to operatively connect the gearing.

17. The combination of a truck having separately-movable axles and carrying-wheels, a motor, and gearing extending between the armature-shaft of the motor and said axles, said gearing including a yielding member or wheel and a frame for supporting the motor and gearing comprising longitudinally-extending beams attached to and uniting the parts of the gearing and separately journaled at their ends upon the axles of the truck.

18. The combination, with a car having carrying-wheels united by separately-movable axles, of a motor for propelling said car and power-connections between the armature-shaft and the said axles, and a frame for supporting said motor, and connections comprising tie-beams connected with the motor and journaled at their ends upon the said axles, gear-wheels upon the axle to be driven, and a flexible connection between the gear-wheel on the axles and the counter-shafts.

In testimony whereof I hereto affix my signature in presence of two witnesses.

CHARLES J. VAN DEPOELE.

Witnesses:
J. W. GIBBONEY,
FRANKLAND JANNUS.